(12) United States Patent
Marks

(10) Patent No.: US 7,639,233 B2
(45) Date of Patent: Dec. 29, 2009

(54) MAN-MACHINE INTERFACE USING A DEFORMABLE DEVICE

(75) Inventor: Richard Marks, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 687 days.

(21) Appl. No.: 11/364,936

(22) Filed: Feb. 28, 2006

(65) Prior Publication Data

US 2006/0139322 A1 Jun. 29, 2006

Related U.S. Application Data

(63) Continuation of application No. 10/207,677, filed on Jul. 27, 2002, now Pat. No. 7,102,615.

(51) Int. Cl.
*G09G 5/00* (2006.01)
(52) U.S. Cl. .............. 345/156; 463/8; 463/37; 463/39; 715/835; 715/856; 715/863; 382/100; 382/103
(58) Field of Classification Search ......... 345/156–158; 463/37–39; 715/835, 856, 863
See application file for complete search history.

(56) References Cited

U.S. PATENT DOCUMENTS

| | | | |
|---|---|---|---|
| 3,943,277 A | 3/1976 | Everly et al. ............... 348/19 |
| 4,263,504 A | 4/1981 | Thomas ...................... 235/454 |
| 4,313,227 A | 1/1982 | Eder ............................ 398/106 |
| 4,558,864 A | 12/1985 | Medwedeff ............. 273/148 B |
| 4,565,999 A | 1/1986 | King et al. ................... 345/158 |
| 4,823,001 A | 4/1989 | Kobayashi et al. .......... 356/616 |
| 4,843,568 A | 6/1989 | Krueger et al. .............. 382/100 |
| 5,034,986 A | 7/1991 | Karmann et al. ............ 382/103 |
| 5,144,594 A | 9/1992 | Gilchrist ..................... 367/129 |
| 5,260,556 A | 11/1993 | Lake et al. ................... 235/494 |
| 5,335,011 A | 8/1994 | Addeo et al. ................. 348/15 |
| 5,517,333 A | 5/1996 | Tamura et al. .............. 358/158 |

(Continued)

FOREIGN PATENT DOCUMENTS

EP 0353200 1/1990

(Continued)

OTHER PUBLICATIONS

"The Tracking Cube: A Three-Dimensional Input Device", IBM Technical Disclosure Bulletin, Aug. 1, 1989, pp. 91-95, No. 3B, IBM Corp.New York, U.S.

(Continued)

*Primary Examiner*—Henry N Tran
(74) *Attorney, Agent, or Firm*—Martine Penilla & Gencarella, LLP (57) ABSTRACT

In one embodiment a method for triggering input commands of a program run on a computing system is provided. The method initiates with monitoring a field of view in front of a capture device. Then, an input object is identified within the field of view. The detected input object is analyzed for changes in shape. Next, a change in the input object is detected. Then, an input command is triggered at the program run on the computing system. The triggering is a result of the detected change in the input object. An input detection program and a computing system are also provided.

20 Claims, 6 Drawing Sheets

U.S. PATENT DOCUMENTS

| | | | |
|---|---|---|---|
| 5,534,917 A | 7/1996 | MacDougall | 348/169 |
| 5,543,818 A | 8/1996 | Scott | 345/168 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,000 A | 3/1997 | Szeliski et al. | 382/294 |
| 5,638,228 A | 6/1997 | Thomas, III | 360/60 |
| 5,649,021 A | 7/1997 | Matey et al. | 382/128 |
| 5,675,828 A | 10/1997 | Stoel et al. | 395/825 |
| 5,677,710 A | 10/1997 | Thompson-Rohrlich | 345/173 |
| 5,768,415 A | 6/1998 | Jagadish et al. | 382/154 |
| 5,796,354 A | 8/1998 | Cartabiano et al. | 341/22 |
| 5,818,424 A | 10/1998 | Korth | 345/158 |
| 5,850,473 A | 12/1998 | Andersson | 382/165 |
| 5,883,616 A | 3/1999 | Koizumi et al. | 345/156 |
| 5,889,672 A | 3/1999 | Schuler et al. | 700/83 |
| 5,923,306 A | 7/1999 | Smith et al. | 345/2 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 6,031,545 A | 2/2000 | Ellenby et al. | 345/435 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,057,909 A | 5/2000 | Yahav et al. | 356/5.04 |
| 6,061,055 A | 5/2000 | Marks | 382/276 |
| 6,072,494 A | 6/2000 | Nguyen | 715/863 |
| 6,075,895 A | 6/2000 | Qiao et al. | 382/218 |
| 6,091,905 A | 7/2000 | Yahav et al. | 396/106 |
| 6,094,625 A | 7/2000 | Ralston | 702/150 |
| 6,097,369 A * | 8/2000 | Wambach | 345/158 |
| 6,100,517 A | 8/2000 | Yahav et al. | 250/208.1 |
| 6,100,895 A | 8/2000 | Miura et al. | 345/426 |
| 6,101,289 A | 8/2000 | Kellner | 382/276 |
| 6,151,009 A | 11/2000 | Kanade et al. | 345/113 |
| 6,166,744 A | 12/2000 | Jaszlics et al. | 345/435 |
| 6,173,059 B1 | 1/2001 | Huang et al. | 381/92 |
| 6,175,343 B1 | 1/2001 | Mitchell et al. | 345/8 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,243,074 B1 | 6/2001 | Fishkin et al. | 345/156 |
| 6,243,491 B1 * | 6/2001 | Andersson | 382/165 |
| 6,275,213 B1 | 8/2001 | Tremblay et al. | 345/156 |
| 6,282,362 B1 | 8/2001 | Murphy et al. | 386/46 |
| 6,295,064 B1 | 9/2001 | Yamaguchi | 345/419 |
| 6,297,838 B1 * | 10/2001 | Chang et al. | 715/863 |
| 6,304,267 B1 | 10/2001 | Sata | 345/427 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,371,849 B1 | 4/2002 | Togami | 463/4 |
| 6,392,644 B1 | 5/2002 | Miyata et al. | 345/419 |
| 6,394,897 B1 | 5/2002 | Togami | 463/4 |
| 6,400,374 B2 | 6/2002 | Lanier | 345/630 |
| 6,409,602 B1 | 6/2002 | Wiltshire et al. | 463/42 |
| 6,411,744 B1 | 6/2002 | Edwards | 382/294 |
| 6,417,836 B1 * | 7/2002 | Kumar et al. | 345/156 |
| 6,441,825 B1 | 8/2002 | Peters | 345/473 |
| 6,504,535 B1 | 1/2003 | Edmark | 345/419 |
| 6,516,466 B1 | 2/2003 | Jackson | 725/62 |
| 6,542,927 B2 | 4/2003 | Rhoads | 709/217 |
| 6,545,706 B1 | 4/2003 | Edwards et al. | 348/169 |
| 6,546,153 B1 | 4/2003 | Hoydal | 382/285 |
| 6,580,414 B1 | 6/2003 | Wergen et al. | 345/156 |
| 6,580,415 B1 | 6/2003 | Kato et al. | 345/156 |
| 6,661,914 B2 | 12/2003 | Dufour | 382/154 |
| 6,676,522 B2 | 1/2004 | Rowe et al. | 463/42 |
| 6,720,949 B1 * | 4/2004 | Pryor et al. | 345/158 |
| 6,749,510 B2 | 6/2004 | Giobbi | 463/42 |
| 6,789,967 B1 | 9/2004 | Forester | 400/489 |
| 6,795,068 B1 * | 9/2004 | Marks | 345/419 |
| 6,846,238 B2 | 1/2005 | Wells | 463/39 |
| 6,847,311 B2 | 1/2005 | Li | 341/28 |
| 6,863,609 B2 | 3/2005 | Okuda et al. | 463/36 |
| 6,881,147 B2 | 4/2005 | Naghi et al. | 463/35 |
| 6,884,171 B2 | 4/2005 | Eck et al. | 463/42 |
| 6,890,262 B2 | 5/2005 | Oishi et al. | 463/31 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,930,725 B1 | 8/2005 | Hayashi | 348/373 |
| 6,931,125 B2 | 8/2005 | Smallwood | 379/433.07 |
| 6,931,596 B2 | 8/2005 | Gutta et al. | 715/728 |
| 6,943,776 B2 | 9/2005 | Ehrenburg | 345/168 |
| 6,945,653 B2 | 9/2005 | Kobori et al. | 353/30 |
| 6,951,515 B2 | 10/2005 | Ohshima et al. | 463/31 |
| 6,952,198 B2 | 10/2005 | Hansen | 345/158 |
| 6,965,362 B1 | 11/2005 | Ishizuka | 345/82 |
| 7,006,009 B2 | 2/2006 | Newman | 340/854.5 |
| 7,023,475 B2 | 4/2006 | Bean et al. | 348/207.99 |
| 7,039,253 B2 | 5/2006 | Matsuoka et al. | 382/295 |
| 7,042,440 B2 | 5/2006 | Pryor et al. | 345/158 |
| 7,054,452 B2 | 5/2006 | Ukita | 381/92 |
| 7,059,962 B2 | 6/2006 | Watashiba | 463/2 |
| 7,071,914 B1 | 7/2006 | Marks | 345/156 |
| 7,082,578 B1 * | 7/2006 | Fishkin et al. | 715/863 |
| 7,084,887 B1 | 8/2006 | Sato et al. | 345/633 |
| 7,090,352 B2 | 8/2006 | Kobor et al. | 353/30 |
| 7,102,615 B2 | 9/2006 | Marks | 345/156 |
| 7,116,330 B2 | 10/2006 | Marshall et al. | 345/474 |
| 7,116,342 B2 | 10/2006 | Dengler et al. | 345/630 |
| 7,121,946 B2 | 10/2006 | Paul et al. | 463/36 |
| 7,161,579 B2 * | 1/2007 | Daniel | 345/156 |
| 7,183,929 B1 | 2/2007 | Antebi et al. | 340/573.1 |
| 7,224,384 B1 | 5/2007 | Iddan et al. | 348/207.99 |
| 7,227,526 B2 | 6/2007 | Hildreth et al. | 345/156 |
| 7,227,976 B1 | 6/2007 | Jung et al. | |
| 7,259,375 B2 | 8/2007 | Tichit et al. | 250/341.8 |
| 7,301,530 B2 | 11/2007 | Lee et al. | 345/158 |
| 2002/0010655 A1 | 1/2002 | Kjallstrom | 705/27 |
| 2002/0056114 A1 | 5/2002 | Fillebrown et al. | 725/78 |
| 2002/0072414 A1 | 6/2002 | Stylinski et al. | 463/42 |
| 2002/0075286 A1 | 6/2002 | Yonezawa et al. | 345/679 |
| 2002/0083461 A1 | 6/2002 | Hutcheson et al. | 725/62 |
| 2002/0094189 A1 | 7/2002 | Navab et al. | 386/4 |
| 2002/0126899 A1 | 9/2002 | Farrell | 382/199 |
| 2003/0014212 A1 | 1/2003 | Ralston et al. | 702/150 |
| 2003/0093591 A1 | 5/2003 | Hohl | 710/22 |
| 2003/0100363 A1 | 5/2003 | Ali | 436/30 |
| 2003/0160862 A1 | 8/2003 | Charlier et al. | 348/14.08 |
| 2003/0232649 A1 | 12/2003 | Gizis et al. | 463/40 |
| 2004/0001082 A1 | 1/2004 | Said | 345/730 |
| 2004/0054512 A1 | 3/2004 | Kim et al. | 703/8 |
| 2004/0063480 A1 | 4/2004 | Wang | 463/8 |
| 2004/0063481 A1 | 4/2004 | Wang | 463/8 |
| 2004/0095327 A1 | 5/2004 | Lo | 345/169 |
| 2004/0140955 A1 | 7/2004 | Metz | 345/166 |
| 2004/0150728 A1 | 8/2004 | Ogino | 348/239 |
| 2004/0213419 A1 | 10/2004 | Varma et al. | 381/92 |
| 2004/0254017 A1 | 12/2004 | Cheng | 463/35 |
| 2005/0037844 A1 | 2/2005 | Shum et al. | 463/36 |
| 2005/0047611 A1 | 3/2005 | Mao | 381/94.7 |
| 2005/0088369 A1 | 4/2005 | Yoshioka | 345/60 |
| 2005/0102374 A1 | 5/2005 | Moragne et al. | 709/217 |
| 2005/0198095 A1 | 9/2005 | Du et al. | 709/200 |
| 2006/0035710 A1 | 2/2006 | Festejo et al. | 463/36 |

| | | | |
|---|---|---|---|
| 2007/0120834 | A1 | 5/2007 | Boillot |
| 2007/0120996 | A1 | 5/2007 | Boillot |
| 2008/0056561 | A1 | 3/2008 | Sawachi |
| 2008/0070684 | A1 | 3/2008 | Haigh-Hutchinson |

FOREIGN PATENT DOCUMENTS

| | | |
|---|---|---|
| EP | 0652686 | 5/1995 |
| EP | 0750202 | 12/1996 |
| FR | 2814965 | 4/2002 |
| GB | 2206716 | 11/1989 |
| GB | 2376397 | 11/2002 |
| JP | 1284897 | 11/1989 |
| JP | 6102980 | 4/1994 |
| JP | 9-128141 | 5/1997 |
| JP | 9-185456 | 7/1997 |
| JP | 11-38949 | 2/1999 |
| JP | 11-312040 | 11/1999 |
| JP | 2000-172431 | 6/2000 |
| JP | 2000259856 | 9/2000 |
| JP | 2000350859 | 12/2000 |
| JP | 2001-166676 | 6/2001 |
| JP | 2002369969 | 12/2002 |
| WO | WO 99/35633 | 7/1999 |
| WO | WO 99/26198 | 10/1999 |
| WO | WO 02/27456 | 2/2002 |

OTHER PUBLICATIONS

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

Lanier, Jaron, "Virtually there: three-dimensional tele-immersion may eventually bring the world to your desk", Scientific American, ISSN: 0036-8733, Year: 2001.

* cited by examiner

MAN-MACHINE INTERFACE USING A DEFORMABLE DEVICE

CROSS REFERENCE TO RELATED APPLICATIONS

This application is a continuation of and claims priority from U.S. patent application Ser. No. 10/207,677 filed on Jul. 27, 2002 now U.S. Pat. No. 7,102,615 and entitled "MAN-MACHINE INTERFACE USING A DEFORMABLE DEVICE", which is incorporated herein by reference in its entirety.

BACKGROUND OF THE INVENTION

1. Field of the Invention

This invention relates generally to gesture input to computer systems, and more particularly to visually tracking a device capable of being deformed, wherein the deformation triggers an action on the part of the computer system.

2. Description of the Related Art

There has been a great deal of interest in searching for alternatives to input devices for computing systems. Visual gesture input devices are becoming more popular. Generally speaking, gesture input refers to having an electronic device such as a computing system, video game console, smart appliance, etc., react to some gesture captured by a video camera that tracks an object.

Tracking of moving objects using digital video cameras and processing the video images for producing various displays has been known in the art. For example, one such application, for producing an animated video version of a sporting event, has been disclosed by Segen, U.S. Pat. No. 6,072,504. According to this system, the position of a tennis ball during play is tracked using a plurality of video cameras, and a set of equations relating the three-dimensional points in the court to two-dimensional points (i.e. pixels) of digital images within the field of view of the cameras are employed. Pixel positions of the ball resolved in a given digital image can be related to a specific three-dimensional position of the ball in play and, using triangulation from respective video images, a series of image frames are analyzed by a least-squares method, to fit the positions of the ball to trajectory equations describing unimpeded segments of motion of the ball.

As described in some detail by Segen, once a three-dimensional description of position and motion of an object has been determined, various methods exist which are well known in the art for producing an animated representation thereof using a program which animates appropriate object movement in a video game environment. That is, Segen is concerned with determining the three-dimensional position of an object in motion from a plurality of two-dimensional video images captured at a point in time. Once the three-dimensional position of the "real" object is known, it is then possible to use this information to control a game program in any number of different ways which are generally known to game programmers.

However, the system of Segen relies on a plurality of video cameras for developing positional information about the object based on triangulation. Moreover, the detected object of Segen is a simple sphere which does not require information about the orientation (e.g. inclination) of the object in space. Thus, the system of Segen is not capable of reconstructing position and orientation of an object, whether moving or at rest, from a two-dimensional video image using a single video camera.

It is common for game programs to have virtual objects formed from a combination of three-dimensional geometric shapes, wherein during running of a game program, three-dimensional descriptions (positions and orientations) of the objects relative to each other are determined by control input parameters entered using an input device such as a joystick, game controller or other input device. The three-dimensional position and orientation of the virtual objects are then projected into a two-dimensional display (with background, lighting and shading, texture, and so forth) to create a three-dimensional perspective scene or rendition by means of the rendering processor functions of the game console.

As an example, there can be "virtual object" that forms a moving image in a game display corresponding to how one moves around the "real" object. To display the virtual object, the calculated three-dimensional information is used for fixing the position and orientation of the "virtual object" in a memory space of the game console, and then rendering of the image is performed by known processing to convert the three-dimensional information into a realistic perspective display.

However, in spite of the above knowledge and techniques, problems continue to hinder successful object tracking, and a particularly difficult problem is extracting precisely only those pixels of a video image which correspond unambiguously to an object of interest. For example, although movement of an object having one color against a solid background of another color, where the object and background colors vary distinctly from one another, can be accomplished with relative ease, tracking of objects, even if brightly colored, is not so easy in the case of multi-colored or non-static backgrounds. Changes in lighting also dramatically affect the apparent color of the object as seen by the video camera, and thus object tracking methods which rely on detecting a particular colored object are highly susceptible to error or require constant re-calibration as lighting conditions change. The typical home use environment for video game programs demands much greater flexibility and robustness than possible with conventional object tracking computer vision systems.

Thus, an alternative input device must be able to be tracked under the home use environment by a single relatively inexpensive camera in order to become widely accepted. Additionally, the alternative input device must be convenient to use. While a glove worn on the hand of a user, where the glove includes sensors that are tracked by a camera to capture input, has been trialed, users have not embraced the glove. One of the reasons for the lack of enthusiasm for a glove is the inconvenience of having to continually remove and put on the glove.

Thus, there is a need to solve the problems of the prior art to provide an input device capable of being tracked by a single video camera, wherein the input device is convenient for the user.

SUMMARY OF THE INVENTION

Broadly speaking, the present invention fills these needs by providing a method and system that provides a passive input device capable of being tracked by a single video camera. It should be appreciated that the present invention can be implemented in numerous ways, including as a process, a system, or a device. Several inventive embodiments of the present invention are described below.

In one embodiment a method for triggering input commands of a program run on a computing system is provided. The method initiates with monitoring a field of view in front of a capture device. Then, an input object is identified within the field of view. The detected input object is analyzed for changes in shape. Next, a change in the input object is detected. Then, an input command is triggered at the program run on the computing system. The triggering is a result of the detected change in the input object.

In another embodiment, an input detection program is provided. The input detection program is executed at a computing device and has program instructions for determining when to trigger input commands of a main program. The input detection program includes program instructions for monitoring a field of view in front of a capture device. The capture device provides data to the input detection program. Program instructions for identifying an input object within the field of view are included. Program instructions for detecting a physical change in the input object and program instructions for triggering an input command at the main program run on the computing device, wherein the triggering is a result of the detected physical change in the input object, are also included.

In yet another embodiment, a computing system is provided. The computing system has an input detection system. The input detection system determines when to trigger input commands of a main program run through the computing system. The computing system includes a capture device. Circuitry for monitoring a field of view in front of the capture device and circuitry for identifying an input object within the field of view are included. Circuitry for detecting a physical change in the input object and circuitry for triggering an input command at the main program run through the computing system are both included. The triggering is a result of the detected physical change in the input object.

In still yet another embodiment, a computing system is provided. The computing system has an input detection system. The input detection system determines when to trigger input commands of a main program run through the computing system. The computing system includes means for capturing image data and means for monitoring a field of view in front of the capture device. Means for identifying an input object within the field of view and means for detecting a physical change in the input object are included. Means for triggering an input command at the main program run through the computing system, wherein the triggering is a result of the detected physical change in the input object, are also included.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an input device that is capable of being deformed, wherein the deformation is captured by a video camera to trigger an event. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The embodiments of the present invention provide a user input device that is capable of being deformed while in the field of view of a video camera. The deformation, such as a change in the input devices aspect ratio, is captured by the video camera and initiates an event or action that can be displayed on a monitor. For example, the deformation of the input device can signify a mouse click to open a file or window for a personal computer, grab, drag or manipulate an image for a computer game, or even start a smart appliance. It should be appreciated that the input device is a passive device, i.e., the input device is an object that can be deformed by an external force. Thus, the input device does not generate any active signals that are transmitted to a receiver. As will be explained by the embodiments described herein the user input device allows an experience that can be related to a mouse click while being convenient for the user.

Figure 1:
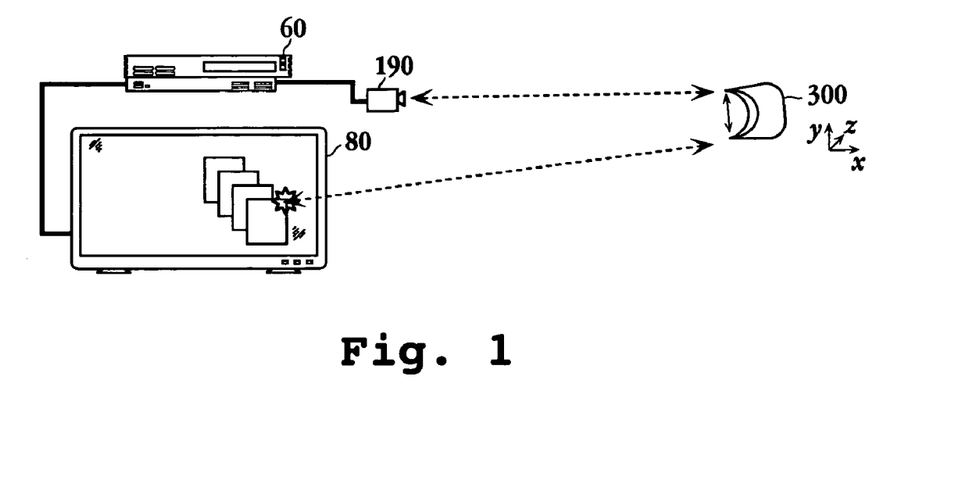
FIG. 1 is a high level schematic diagram of an overall system configuration capable of tracking a user input device in accordance with one embodiment of the invention.

FIG. 1 is a high level schematic diagram of an overall system configuration capable of tracking a user input device in accordance with one embodiment of the invention. Here user input device 300 can change its aspect ratio by applying pressure to squeeze the top and bottom together. In one embodiment, the change is aspect ratio is captured by digital video camera 190. Digital video camera 190 is in communication with video game console 60. In one embodiment, the event is an input command of a main program run on a computing system, such as a game console. Video game console 60 is in communication with monitor 80. Thus, the change in aspect ratio of user input device triggers an event allowing a user to manipulate an image on monitor 80. It should be appreciated that user input device is tracked as it moves in either the x, y, or z planes. The movement in these planes allows for clicking and dragging functionality similar to a mouse. That is, by squeezing user input device 300 to change an aspect ratio and moving the input device while deformed, a user can move or manipulate an image on the display monitor. While a video game console is depicted here, the embodiments described herein are applicable to a personal computer and other consumer electronic devices such as television, digital video disc (DVD) players, smart appliances, etc.

Still referring to FIG. 1, user input device 300 may be a deformable half-cylinder capable of fitting inside a users palm in one embodiment. User input device 300 can be made out of any suitable material capable of being deformed through the application of pressure and returning to its original shape upon the release of the pressure. A user locates an input device in the field of view of video camera 190, which may be a USB web cam or a digital camcorder connected to input/output port of game console 60 such as the "Playstation 2"® manufactured by Sony Computer Entertainment Inc. As the user moves user input device 300 into the field of view of camera 190, the physical features, such as size, shape, color, etc., of the user input device are picked up by camera 190. Processing is then performed in order to isolate and discriminate a pixel group corresponding only the user input device. A three-dimensional description of the cylinder, including its position and orientation in three-dimensional space, is calculated, and this description is correspondingly stored in a main memory of game console 60. Then, using rendering techniques known in the art, the three-dimensional description of the object is used to cause an action in a game program which is displayed on the display screen of monitor 80. For example, an object on monitor 80 can be moved throughout the scene of the game, corresponding to the movements of user input device 300. As the user changes the position and orientation of user input device 300 while the aspect ratio change has been detected, the three-dimensional description of the object in memory, and a corresponding rendering of the object in the rendering area of image memory, are continuously updated so that the position and orientation of the object on monitor 80 changes as well. Thus, a visual trigger caused by a user applying a force to a passive input device results in an action, such as an input command being executed by a main program associated with a computing system.

Figure 2:
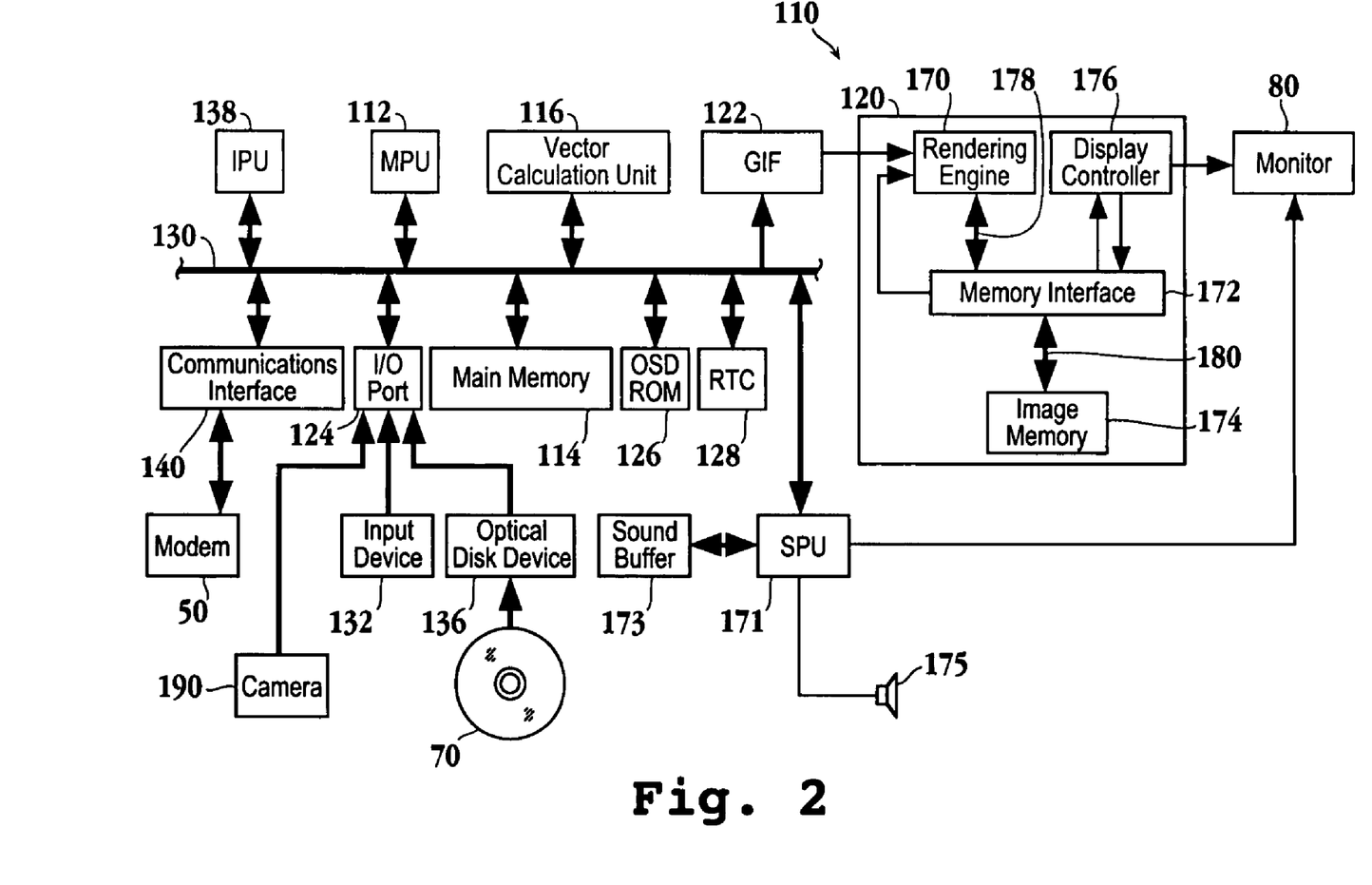
FIG. 2 is a block diagram of a configuration of the components of a video game console adapted for use with a manipulated object serving as an alternative input device in accordance with one embodiment of the invention.

FIG. 2 is a block diagram of a configuration of the components of a video game console adapted for use with a manipulated object serving as an alternative input device in accordance with one embodiment of the invention. Game console 60 constitutes a component of an overall entertainment system 110 according to the present invention which, as shown in FIG. 2 is equipped by a multiprocessor unit (MPU) 112 for control of overall system 110, main memory 114 which is used for various program operations and for storage of data, vector calculation unit 116 for performing floating point vector calculations necessary for geometry processing, image processor 120 for generating data based on controls from MPU 112, and for outputting video signals to monitor 80 (for example a CRT), a graphics interface (GIF) 122 for carrying out mediation and the like over a transmission bus between MPU 112 or vector calculation unit 116 and image processor 120, input/output port 124 for facilitating reception and transmission of a data to and from peripheral devices, internal OSD functional ROM (OSDROM) 126 constituted by, for example, a flash memory, for performing control of a kernel or the like, and real time clock 128 having calendar and timer functions.

Main memory 114, vector calculation unit 116, GIF 122, OSDROM 126, real time clock (RTC) 128 and input/output port 124 are connected to MPU 112 over data bus 130. Also connected to BUS 130 is image processing unit 138 which is a processor for expanding compressed moving images and texture images, thereby developing the image data. For example, the image processing unit 138 can serve functions for decoding and development of bit streams according to the MPEG2 or MPEG4 standard formats, macroblock decoding, performing inverse discrete cosine transformations, color space conversion, vector quantization and the like.

A sound system is constituted by sound processing unit SPU 171 for generating musical or other sound effects on the basis of instructions from MPU 112, sound buffer 173 into which waveform data may be recorded by SPU 171, and speaker 175 for outputting the musical or other sound effects generated by SPU 171. It should be understood that speaker 175 may be incorporated as part of monitor 80 or may be provided as a separate audio line-out connection attached to external speaker 175.

Communications interface 140 is also provided, connected to BUS 130, which is an interface having functions of input/output of digital data, and for input of digital contents according to the present invention. For example, through communications interface 140, user input data may be transmitted to, and status data received from, a server terminal on a network in order to accommodate on-line video gaming applications. Input device 132 (also known as a controller) for input of data (e.g. key input data or coordinate data) with respect to the entertainment system 110 optical disk device 136 for reproduction of the contents of optical disk 70, for example a CD-ROM or the like on which various programs and data (i.e. data concerning objects, texture data and the like), are connected to input/output port 124.

As a further extension or alternative to the input device, the present invention includes digital video camera 190 which is connected to input/output port 124. Input/output port 124 may be embodied by one or more input interfaces, including serial and USB interfaces, wherein digital video camera 190 may advantageously make use of the USB input or any other conventional interface appropriate for use with camera 190.

The above-mentioned image processor 120 includes a rendering engine 170, interface 172, image memory 174 and a display control device 176 (e.g. a programmable CRT controller, or the like). The rendering engine 170 executes operations for rendering of predetermined image data in the image memory, through memory interface 172, and in correspondence with rendering commands which are supplied from MPU 112. The rendering engine 170 has the capability of rendering, in real time, image data of 320×240 pixels or 640×480 pixels, conforming to, for example, NTSC or PAL standards, and more specifically, at a rate greater than ten to several tens of times per interval of from 1/60 to 1/30 of a second.

BUS 178 is connected between memory interface 172 and the rendering engine 170, and a second BUS 180 is connected between memory interface 172 and the image memory 174. First BUS 178 and second BUS 180, respectively, have a bit width of, for example 128 bits, and the rendering engine 170 is capable of executing high speed rendering processing with respect to the image memory. Image memory 174 employs a unified memory structure in which, for example, a texture rendering region and a display rendering region, can be set in a uniform area.

Display controller 176 is structured so as to write the texture data which has been retrieved from optical disk 70 through optical disk device 136, or texture data which has been created on main memory 114, to the texture rendering region of image memory 174, via memory interface 172. Image data which has been rendered in the display rendering region of image memory 174 is read out via memory interface 172, outputting the same to monitor 80 whereby it is displayed on a screen thereof.

Figure 3:
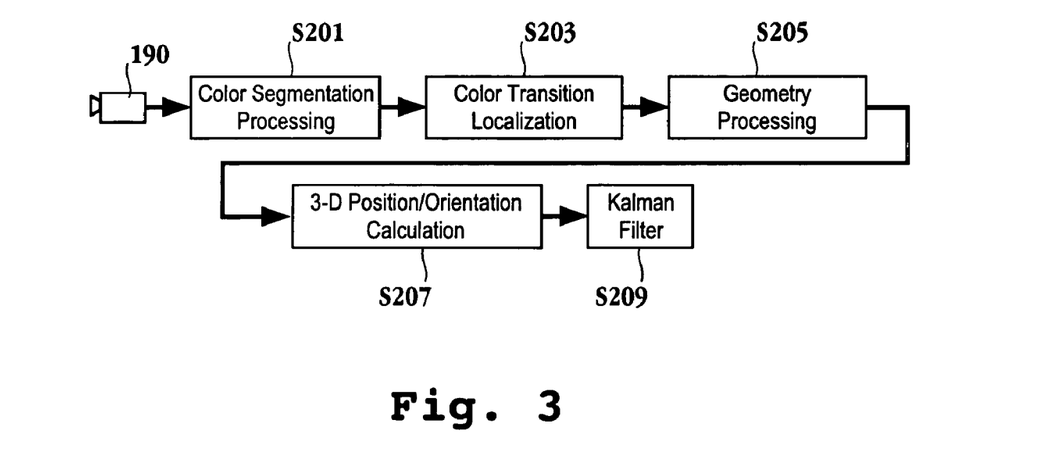
FIG. 3 is a block diagram showing the functional blocks used to track and discriminate a pixel group corresponding to the user input device as it is being manipulated by the user in accordance with one embodiment of the invention.

FIG. 3 is a block diagram showing the functional blocks used to track and discriminate a pixel group corresponding to the user input device as it is being manipulated by the user in accordance with one embodiment of the invention. It shall be understood that the functions depicted by the blocks are implemented by software which is executed by the MPU 112 in game console 60. Moreover, not all of the functions indicted by the blocks in FIG. 3 are used for each embodiment.

Initially the pixel data input from the camera is supplied to game console 60 through input/output port interface 124, enabling the following processes to be performed thereon. First, as each pixel of the image is sampled, for example, on a raster basis, a color segmentation processing step S201 is performed, whereby the color of each pixel is determined and the image is divided into various two-dimensional segments of different colors. Next, for certain embodiments, a color transition localization step S203 is performed, whereby regions where segments of different colors adjoin are more specifically determined, thereby defining the locations of the image in which distinct color transitions occur. Then, a step for geometry processing S205 is performed which, depending on the embodiment, comprises either an edge detection process or performing calculations for area statistics, to thereby define in algebraic or geometric terms the lines, curves and/or polygons corresponding to the edges of the object of interest. For example, in the case of the user input device shown in FIG. 1 the pixel area will comprise a generally rectangular shape corresponding to an orthogonal frontal view of the user input device. From the algebraic or geometric description of the rectangle, it is possible to define the center, width, length and two-dimensional orientation of the pixel group corresponding only to the object.

The three-dimensional position and orientation of the object are calculated in step S207, according to algorithms which are to be described in association with the subsequent descriptions of preferred embodiments of the present invention. The data of three-dimensional position and orientation also undergoes a processing step S209 for Kalman filtering to improve performance. Such processing is performed to estimate where the object is going to be at a point in time, and to reject spurious measurements that could not be possible, and therefore are considered to lie outside the true data set. Another reason for Kalman filtering is that the camera 190 produces images at 30 Hz, whereas the typical display runs at 60 Hz, so Kalman filtering fills the gaps in the data used for controlling action in the game program. Smoothing of discrete data via Kalman filtering is well known in the field of computer vision and hence will not be elaborated on further. Further information concerning the processing of the data and the associated hardware is contained in U.S. application Ser. No. 09/621,578, which is hereby incorporated by reference.

Figure 4A:
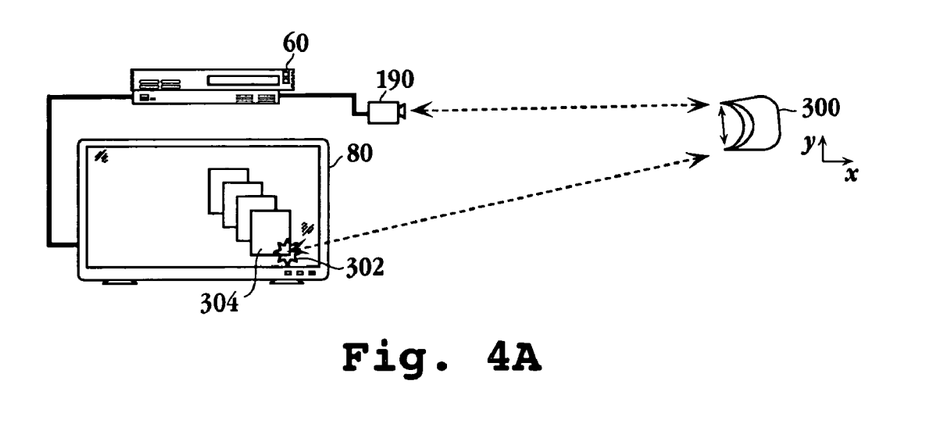
FIG. 4A is a schematic diagram of a deformable user input device configured to be tracked in the X, Y direction and enabled to trigger an event to be displayed on a monitor in accordance with one embodiment of the invention.

FIG. 4A is a schematic diagram of a deformable user input device configured to be tracked in the X, Y direction and enabled to trigger an event to be displayed on a monitor in accordance with one embodiment of the invention. Deformable user input device 300 is tracked by video camera 190. Video camera 190 is in communication with game console 60 which in turn is in communication with monitor 80. In one embodiment, deformable device 300 is tracked by digital video camera 190 through color as described above. That is, the user input device is a distinct color capable of being tracked when in the field of view of camera 190. As can be seen, deformable device 300 is essentially a portion of a cylinder that has been cut in half. That is, deformable device 300 can fit inside the palm of a hand in accordance with one embodiment. Thus, as deformable device 300 is deformed the aspect ratio of the deformable device changes and is captured by digital video camera 190. This captured change in aspect ratio is communicated to console 60 which in turn results in an event being triggered and displayed on monitor 80. For example, deformable device 300 can be used similar to a mouse so that an object or an object in a window can be accessed and moved around.

In one embodiment, image 304 can be grabbed at point 302 and dragged or manipulated as desired. One skilled in the art will appreciate that any number of suitable operations can be performed, wherein deformable device 300 is capable of accomplishing similar functionality as a mouse. Of course, deformable device 300 can be used to play a video game or any other suitable interactive game where mouse-like functionality is required. Here, the change in aspect ratio of deformable device 300 is comparable to a mouse click and the image can be dragged while the aspect ratio has been changed from its initial position. Thus, user input device can be used to play a card game. One skilled in the art will appreciate that there are an abundance of applications in which the mouse-like functionality described herein can be applied.

Figure 4B:
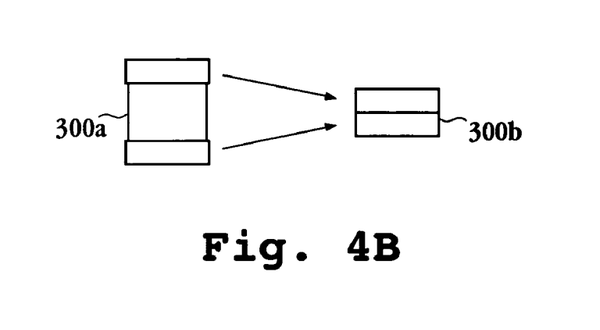
FIG. 4B is a simplified schematic diagram of a change in aspect ratio of the deformable device as seen from a frontal view in accordance with one embodiment of the invention.

FIG. 4B is a simplified schematic diagram of a change in aspect ratio of the deformable device as seen from a frontal view in accordance with one embodiment of the invention. Deformable device is in a relaxed position 300A. As a user squeezes down on the deformable device, the aspect ratio changes to a closed position 300B. It should be appreciated that the input device described herein provides haptic/tactile feedback to a user, which corresponds to an action being triggered.

Figure 5:
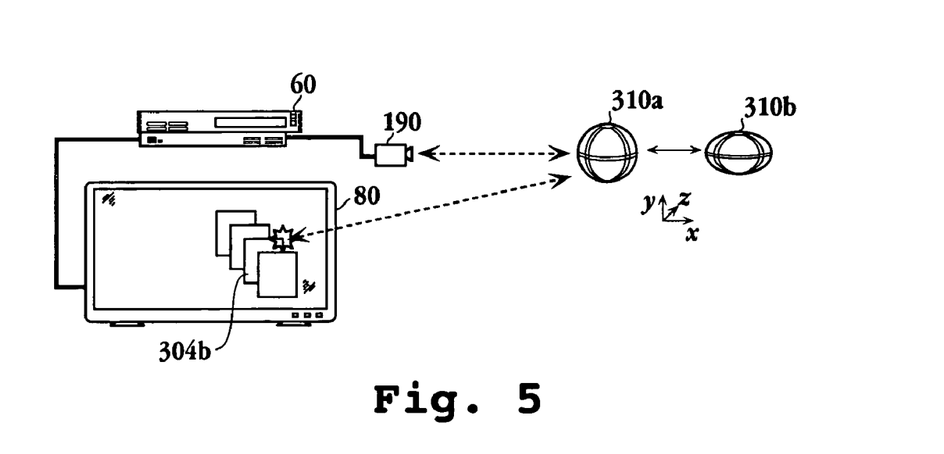
FIG. 5 is a schematic diagram of an alternative embodiment of a deformable user input device in accordance with one embodiment of the invention.

FIG. 5 is a schematic diagram of an alternative embodiment of a deformable user input device in accordance with one embodiment of the invention. Here, deformable user input device 310 can exist in a relaxed state 310A or a depressed state 310B, according to the force applied to the deformable device by a user. Thus, deformable device 310 is in the form of a collapsible ball here. More generally, any type of deformable sphere can be tracked by the visual tracking system described herein. It should be appreciated that in this embodiment, the area of deformable device 310 as seen by video digital camera 190 remains constant. Thus, in addition to capturing X and Y planar movements of deformable device 310, digital video camera 190 can also capture movement in the Z direction. The Z direction can be used to pull a file, such as file 304B forward or backwards, i.e., in a depth wise fashion as illustrated on monitor 80. Additionally, displayed objects that have been grabbed by deformable device 310 can be made to appear smaller or larger, depending on the direction along the Z axis that deformable device 310 is moved. For example, if deformable device 310 is brought closer to camera 190 the displayed object will be made to appear larger while if deformable device 310 is moved away from camera 190 the displayed object will appear to be smaller on monitor 80, in one embodiment. One skilled in the art will appreciate that the displayed object can be made to change its size and location by a combination of movement if the X, Y and Z directions. Here an angle, theta ($\theta$), is used to determine the movement in three dimensional space. One skilled in the art will appreciate that theta is an angle in the direction of the view plane of camera 190.

Still referring to FIG. 5, the camera captures the position of deformable device 310. The positional information is communicated to game console 60. The positional information is processed by game console 60, as described above with reference to FIGS. 1-3. As the aspect ratio or relative position of the deformable device changes, the processing translates the movement to an object being displayed on monitor 80. It should be appreciated that an audio signal can be generated upon the change in aspect ratio of the deformable device in one embodiment of the invention. Additionally, a passive button-press signal can be included in the deformable device. Accordingly, the user would perceive a clicking experience even the clicking noise is not sensed by the computing system.

In one embodiment, the x, y, z, $\theta$, and squeeze parameters are determined through the analysis of the pixels in the image. It should be appreciated that the pixels in the image are part of the object, i.e., deformable device, being tracked. In particular, X is proportional to the horizontal centroid of the pixels in the image. Y is proportional to the vertical centroid of the pixels in the image. Z is inversely proportional to the square root of either the area of the pixels or the principle second moment (producing different accuracy/robustness behavior). Theta ($\theta$) corresponds to the rotation angle of the principle second moment. Squeeze parameters, such as squeeze amount, i.e., amount of deformation or change in an aspect ratio, is proportional to the square root of the principle second moment divided by the square root of the minimal second moment. Each of the above mentioned parameters can be computed from a single pass through the image. Thus, the implementation described herein is very fast and less sensitive to noise, i.e., visual error, than other commonly used metrics.

Figure 6A:
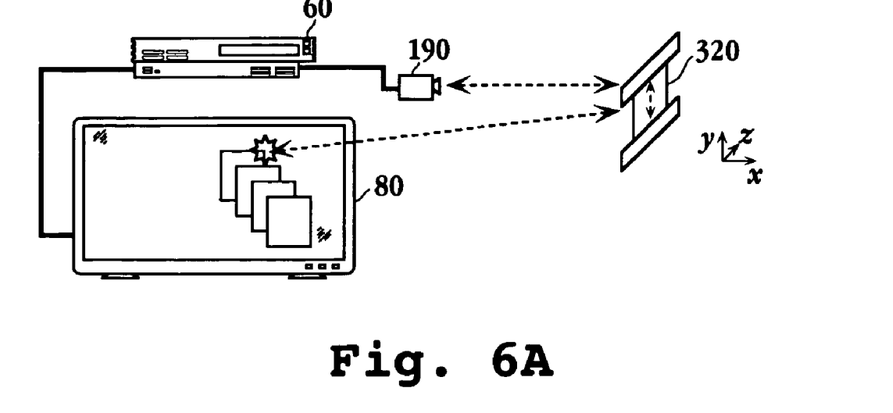
FIG. 6A is a simplified schematic diagram of yet another embodiment of the deformable user input device as discussed with reference to FIGS. 4A, 4B and 5.

FIG. 6A is a simplified schematic diagram of yet another embodiment of the deformable user input device as discussed with reference to FIGS. 4A, 4B and 5. Here, deformable device 320 includes an upper section and a lower section joined together so that the distance between the upper and lower sections can be changed by applying a force to bring the sections together. Thus, the aspect ratio will change as pressure is applied on both ends of deformable device 320. However, the area of deformable device 320 remains constant, therefore, camera 190 can track movement of the deformable device in the X, Y, and Z planes. As mentioned above, deformable user input device 320 can be composed of any suitable material capable of being deformed and returning to its original shape.

Figure 6B:
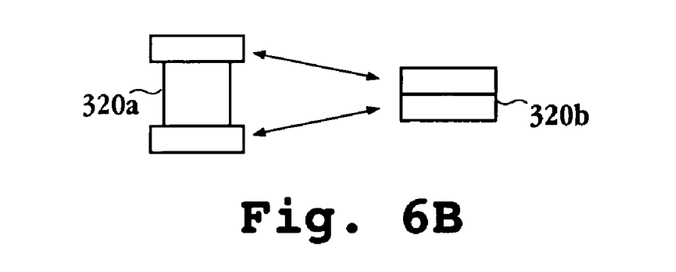
FIG. 6B is a simplified schematic diagram of a deformable device in a relaxed position and in a closed position.

FIG. 6B is a simplified schematic diagram of deformable device 320 in a relaxed position 320A and in a closed position 320B. One skilled in the art will appreciate that, as mentioned above, the area of deformable device 320 detected by camera 190 remains the same. That is, the number of pixels in relaxed state 320A is the same as the number of pixels in depressed state 320B. Consequently, the movement can be tracked in three dimensional space.

Figure 6C:
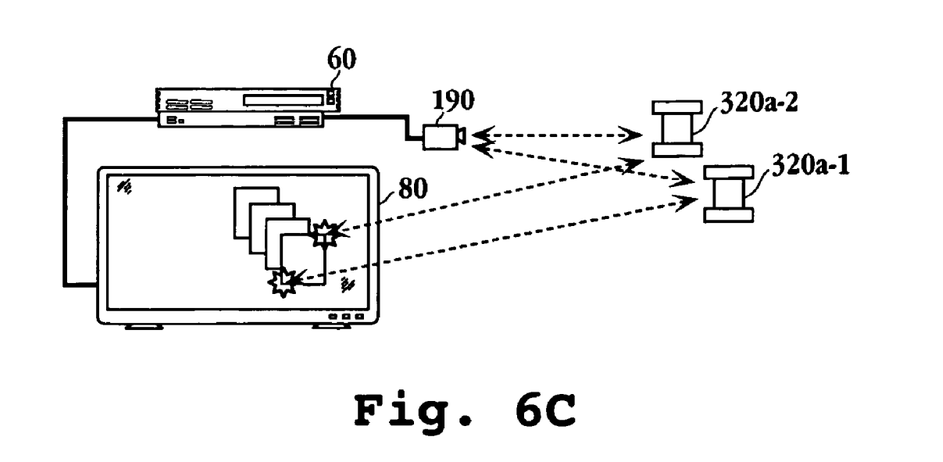
FIG. 6C is an alternative to FIG. 6A where two deformable devices are used rather than one.

FIG. 6C is an alternative to FIG. 6A where two deformable devices are used rather than one. Here, a user may have each deformable device 320A-1 and 320A-2 in each hand. Deformable devices 320A-1 and 320A-2 can be used to grab or manipulate an image on display 80. Devices 320A-1 and 320A-2 can operate on the same image or different images. In one embodiment, the image of a user holding one or two deformable devices 320 can be captured by camera 190 so that an image of the user holding one or more deformable user input devices 320 can be presented on monitor 80.

The embodiments described herein can also use retro-reflective material. The retro-reflective material can be in the form of tape, paints, plastics, etc., that may be applied to a face of the deformable device, such as the frontal portion of deformable device 320 that is facing camera 190. Here, camera 190 would include a light that would be directed toward a deformable device. As is generally known, the light reflected from the retro-reflective material will be directed towards camera 190. The light source can be any visible or non-visible light wavelength. In one embodiment the light source is an infrared light source.

Figure 7:
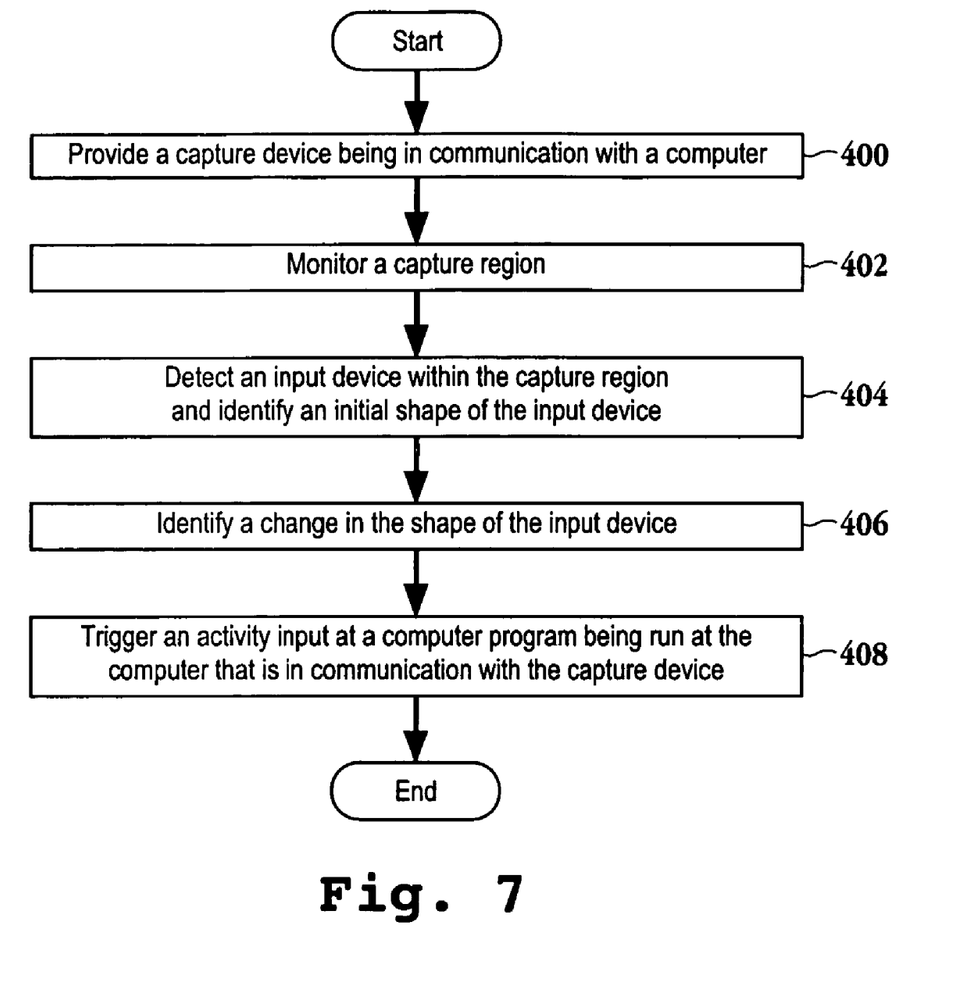
FIG. 7 is a flowchart diagram of the method operations for triggering input commands of a program run on a computing system in accordance with one embodiment of the invention.

FIG. 7 is a flowchart diagram of the method operations for triggering input commands of a program run on a computing system in accordance with one embodiment of the invention. The method initiates with operation 400 where a capture device in communication with a computer is provided. The capture device is a digital camera, such as a web cam, in one embodiment. The computing system can be a console with a monitor as described with reference to FIGS. 1-3. The method then advances to operation 402 where a capture region is monitored. The capture region is the field of view of the capture device in one embodiment.

The method of FIG. 7 then moves to operation 404, where an input device is detected within the capture region and an initial shape of the input device is identified. Here, the input device as described with reference to FIGS. 4-6C can be brought into the field of view of the capture device by a user. The shape of the input device can be any suitable shape, such as the user input devices described with respect to FIGS. 4-6C. In one embodiment, the input device is configured so that an aspect ratio of a frontal projection capable of being monitored by the capture device can be modified. The method then advances to operation 406, where a change in the shape of the input device is identified. For example, a user may squeeze the input device, thereby changing the aspect ratio of the input device. The method then proceeds to operation 408 where, in response to the detected change in shape of the input device, an activity input is triggered at a computer program being run at the computer that is in communication with the capture device. In one embodiment, the change of the shape of the user input device occurs while an icon corresponding to the input device is located over an image on a monitor. The change in shape causes the image to be selected, similar to a mouse click. In another embodiment, movement of the user input device while maintaining the changed shape of the user input device causes the selected image to move or change. It should be appreciated that multiple user input devices can be included. For example, a user can hold one user input device in each hand.

Figure 8:
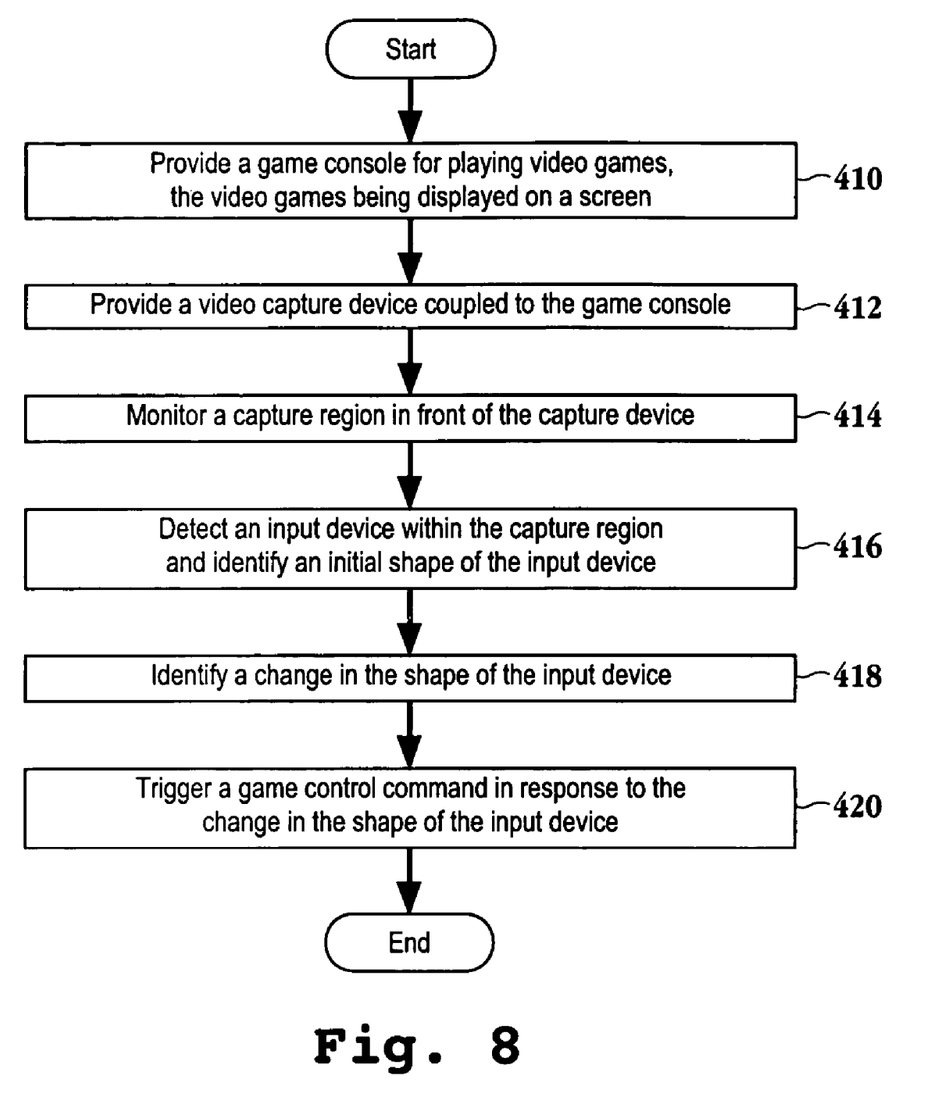
FIG. 8 is a flowchart of the method operations for triggering a game control command for a video game in accordance with one embodiment of the invention.

FIG. 8 is a flowchart of the method operations for triggering a game control command for a video game in accordance with one embodiment of the invention. The method initiates with operation 410 where a game console for playing video games is provided. The video games are displayed on a screen. In one embodiment the game console is the "PLAYSTATION 2"® game console. The method then proceeds to operation 412 where a video capture device coupled to the game console is provided. The capture device is a digital camera, such as a web cam, in one embodiment. The method then moves to operation 414 where a capture region in front of the capture device is monitored. As mentioned above, the capture region is the field of view of the capture device in one embodiment.

The method of FIG. 8 then advances to operation 416 where an input device is detected within the capture region and an initial shape of the input device is identified. Here, the input device as described with reference to FIGS. 4-6C can be brought into the field of view of the capture device by a user. In one embodiment, the capture device detects the input device by sending out light from a light source proximate to the capture device. In this embodiment, the input device would include retro-reflective material configured to reflect light directly back to the source generating the light. The method then advances to operation 418, where a change in the shape of the input device is identified. For example, a user may squeeze the input device, thereby changing the aspect ratio of the input device. The method then proceeds to operation 420 where in response to the detected change in shape of the input device, a game control command is triggered at a computer program being run at the game console that is in communication with the capture device. In one embodiment, movement of the user input device while maintaining the changed shape of the user input device causes the selected image to move or change size. In another embodiment, the degree that the aspect ratio changes indicates the force of a grip during a video game. For example, the larger the change in aspect ratio, the tighter the grip for a particular video game feature.

In summary, a change in the aspect ratio of the deformable devices defined herein triggers an event or action comparable to a mouse click or grabbing operation. It should be appreciated that any number of events can be triggered by the change in aspect ratio. For example, a pull-down menu can be accessed, video games can be played, objects can be grabbed, moved forward, moved backward, stacked or layered, etc. Furthermore, by the act of squeezing the user input device to change its aspect ratio, an event can be simulated, such as a button press or a grab action. The camera capturing the change of shape of the user input device is configured to track the device using color in one embodiment. Alternatively, the camera can track the device using light with retro-reflective material applied to the deformable device. The deformable devices described herein can take any suitable shape such that the user experiences the feel of a click without having to use a mouse i.e., receive haptic/tactile feedback. In essence, the functionality of a glove is achieved without a user having to wear a glove. While the embodiments described above have been described with respect to a video game console, the embodiments are meant to be exemplary and not restrictive. The deformable devices described herein can also be applied to a personal computer, consumer electronics, such as televisions, VCR's, home theater systems, etc., as well as to a smart device such as a kitchen appliance, etc. One skilled in the art will appreciate that above mentioned embodiments are applicable to a game console running the video games as well as on-line video gaming where a user accesses the video games from a server.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced. Accordingly, the present embodiments are to be considered as illustrative and not restrictive, and the invention is not to be limited to the details given herein, but may be modified within the scope and equivalents of the description.

What is claimed is:

1. A method for triggering input commands of a program run on a computing system, comprising:
   monitoring a field of view in front of a capture device;
   identifying an input object within the field of view, the input object being held in a human hand and analyzed for changes in shape;
   detecting a change in the shape of the input object held in the human hand; and
   triggering an input command at the program run on the computing system, the triggering being a result of the detected change in shape of the input object, the change in shape being physical of the input object.

2. The method of claim 1, wherein the video capture device is a digital video camera.

3. The method of claim 2, wherein the digital video camera tracks a color of the input object.

4. The method of claim 2, wherein the digital video camera tracks reflected light from the input object.

5. The method of claim 1, wherein the method operation of detecting a change in shape of the input object further includes:
   detecting a change in an aspect ratio of the input object; and
   detecting a change in the position of the input object.

6. The method of claim 5, wherein the input command causes a change in a size of an image being displayed on a monitor coupled to the computing system.

7. The method of claim 5, wherein the input command causes an image being displayed on a monitor coupled to the computing system to be selected.

8. The method of claim 1, wherein the program is a video game and the computing system is a game console.

9. A computer implemented input detection program executed at a computing device, the input detection program having program instructions stored on a computer readable medium for determining when to trigger input commands of a main program, the input detection program, comprising:
   program instructions for monitoring a field of view in front of a capture device, the capture device providing data to the input detection program;
   program instructions for identifying an input object within the field of view, as held by a human hand;
   program instructions for detecting a physical change in shape of the input object when held by the human hand; and
   program instructions for triggering an input command at the main program run on the computing device, the triggering being a result of the detected physical change in shape of the input object.

10. The computer implemented input detection program of claim 9, wherein the program instructions for detecting a physical change in the shape of the input object includes:
    program instructions for detecting a change in an aspect ratio of the input object; and
    program instructions for detecting a change in the position of the input object.

11. The input computer implemented detection program of claim 9, wherein the computing device is a video game console.

12. The computer implemented input detection program of claim 9, wherein the input object is a collapsible sphere.

13. The computer implemented input detection program of claim 9, wherein the program instructions for triggering an input command causes a change in a size of an image being displayed on a monitor coupled to the computing system.

14. A computing system, the computing system having an input detection system, the input detection system determines when to trigger input commands of a main program run through the computing system, the computing system comprising:
- a capture device;
- circuitry for monitoring a field of view in front of the capture device;
- circuitry for identifying an input object within the field of view, the input object being held in a human hand;
- circuitry for detecting a physical change in shape of the input object; and
- circuitry for triggering an input command at the main program run through the computing system, the triggering being a result of the detected physical change in shape of the input object.

15. The computing system of claim 14, wherein the computing system is a game console.

16. The computing system of claim 14, wherein the circuitry for detecting a physical change in shape of the input object includes:
- circuitry for detecting a change in an aspect ratio of the input object; and
- circuitry for detecting a change in the position of the input object.

17. A computing system, the computing system having an input detection system, the input detection system determines when to trigger input commands of a main program run through the computing system, the computing system comprising:
- means for capturing image data;
- means for monitoring a field of view in front of the capture device;
- means for identifying an input object within the field of view, the input object being held by a human hand;
- means for detecting a physical change in size of the input object; and
- means for triggering an input command at the main program run through the computing system, the triggering being a result of the detected physical change in size of the input object.

18. The computing system of claim 17, wherein the means for detecting a physical change in size of the input object includes:
- means for detecting a change in an aspect ratio of the input object; and
- means for detecting a change in the position of the input object.

19. The computing system of claim 17, wherein the input object is a passive device.

20. The computing system of claim 17, wherein the computing system is a game console.

* * * * *